(12) United States Patent
Itoh (10) Patent No.: US 6,810,156 B1
(45) Date of Patent: Oct. 26, 2004

(54) IMAGE INTERPOLATION DEVICE

(75) Inventor: Motomitsu Itoh, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 915 days.

(21) Appl. No.: 09/615,403

(22) Filed: Jul. 13, 2000

(30) Foreign Application Priority Data

Jul. 15, 1999 (JP) .......................................... H11-201114
May 19, 2000 (JP) ........................................ 2000-147197

(51) Int. Cl.[7] ............................ G06K 9/32; G06K 9/48
(52) U.S. Cl. ...................................... 382/300; 382/199
(58) Field of Search ................................. 382/190, 199, 382/286, 296, 299, 300; 358/1.2, 525

(56) References Cited

U.S. PATENT DOCUMENTS 6,408,109 B1 * 6/2002 Silver et al. ................ 382/300
6,563,538 B1 * 5/2003 Utagawa .................... 382/300

FOREIGN PATENT DOCUMENTS

| JP | H6-153169 | 5/1994 |
| JP | 11-146346 | 5/1999 |
| KR | 1999-27636 | 4/1999 |

* cited by examiner

*Primary Examiner*—Leo Boudreau
*Assistant Examiner*—Duy M. Dang
(74) *Attorney, Agent, or Firm*—David G. Conlin; William J. Daley, Jr.; Edwards & Angell, LLP (57) ABSTRACT

Out of a plurality of pairs of input pixels that face each other across a pixel to be interpolated, that pair which exhibits the highest correlation is selected. Assume that this pair is composed of a first and a second pixel, that the sign of the difference between the value of the input pixel lying adjacently on the left of the first pixel and the value of the first pixel is a, that the sign of the difference between the value of the input pixel lying adjacently on the left of the second pixel and the value of the second pixel is c, that the sign of the difference between the value of the input pixel lying adjacently on the right of the first pixel and the value of the first pixel is b, and that the sign of the difference between the value of the input pixel lying adjacently on the right of the second pixel and the value of the second pixel is d. If a=c or b=d, the average value of the values of the first and second pixels is determined as the value of the pixel to be interpolated.

18 Claims, 10 Drawing Sheets

Fig.13B PRIOR ART

IMAGE INTERPOLATION DEVICE

BACKGROUND OF THE INVENTION

1. Field of the Invention

The present invention relates to an image interpolation device for interpolating an image.

2. Description of the Prior Art

Interpolation of an image is required, for example, when an image for interlaced scanning is converted into an image for progressive scanning, when an image is enlarged, and when the resolution of an image is increased. Such interpolation of an image is achieved, for example, by increasing the number of lines constituting the image. Specifically, according to conventionally well-know methods, between every two lines of the original image, an interpolated line is added that is produced either by using the lines of the original image immediately above or below this interpolated line intact, or by calculating the average value between the lines of the original image immediately above and below this interpolated line.

However, the former method makes the outline of a figure, such as a slanted line, that exhibits no correlation in the vertical direction appear rugged. On the other hand, the latter method degrades the resulting image by making it appear blurred. To solve these problems, a method has been proposed in which interpolation of an image is achieved by adding interpolated pixels in such a way that, out of a plurality of pairs of adjacent original pixels (note that, throughout the present specification, "adjacent original pixels" denote those of the pixels of the original image which are arranged in lines adjacent to a given line of interpolated pixels) that are so located as to face each other across a given pixel to be interpolated, that pair which exhibits the highest correlation is used to produce this interpolated pixel. Note that, hereafter, a pixel or line to be interpolated will be referred to simply as an "interpolated pixel or line".

Figure 11:
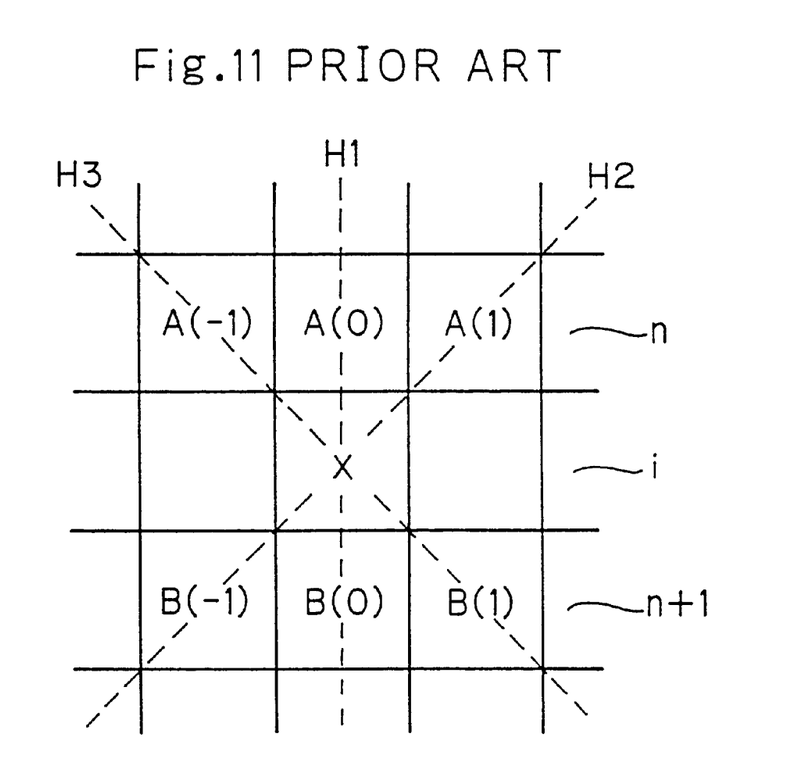
FIG. 11 is a diagram illustrating how interpolation of an image is achieved conventionally.

This method will be described in more detail below with reference to FIG. 11. In FIG. 11, the symbols n and n+1 represent lines of the original image, and the symbol i represents an interpolated line. To find the direction in which the highest correlation is observed among three vertical and diagonal directions H1, H2, and H3 with respect to a given interpolated pixel X, the absolute value of the difference between two adjacent original pixels is calculated in each of those directions H1, H2, and H3. Specifically, $|A(0)-B(0)|$, $|A(1)-B(-1)|$, and $|A(-1)-B(1)|$ are calculated. Then, assuming that the highest correlation is observed in the direction in which the absolute value of the difference is smallest, the average value of the two adjacent original pixels is calculated in that direction and is determined as the value of the interpolated pixel X. For example, if the highest correlation is observed in the direction H3 among the above-mentioned three directions H1, H2, and H3, then $(A(-1)+B(1))/2$ is determined as the value of the interpolated pixel X.

Figure 12A:
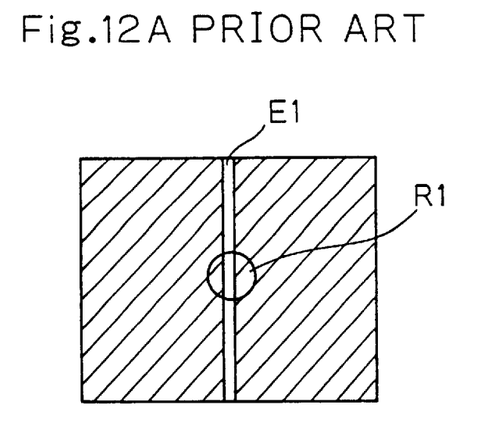
FIGS. 12A and 12B are diagrams illustrating the problems associated with conventional image interpolation methods.
Figure 12B:
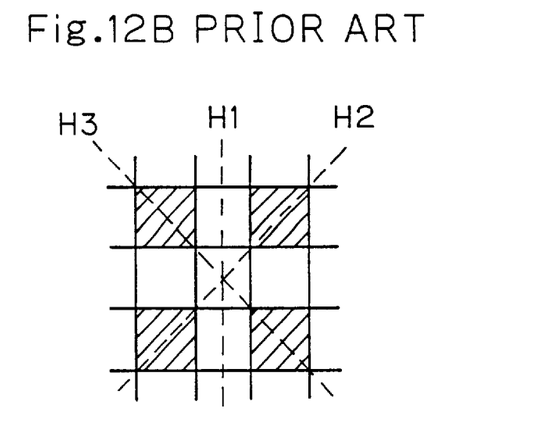
Figure 13A:
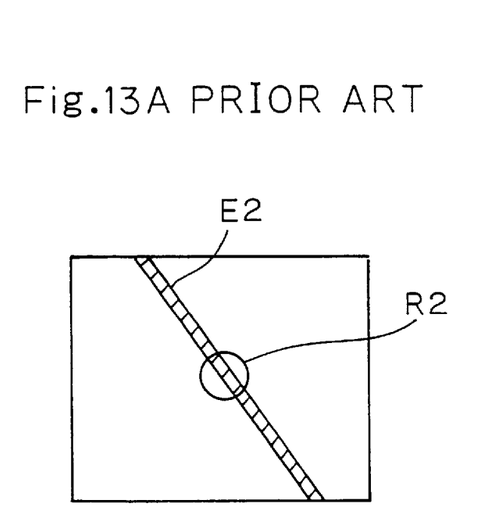
FIGS. 13A and 13B are diagrams illustrating the problems associated with conventional image interpolation methods.
Figure 13B:
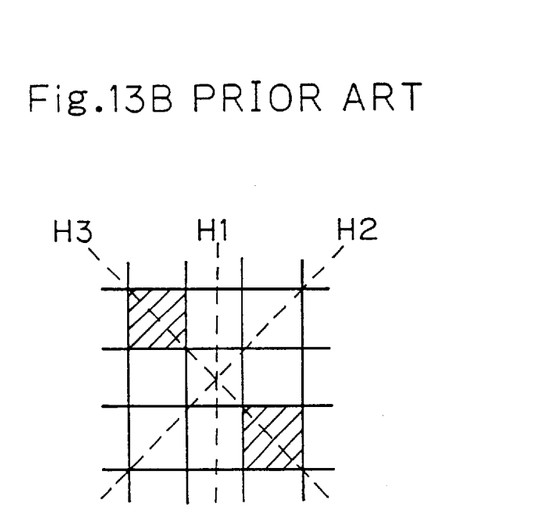

In an image having a fine vertical line E1 that is one pixel wide and brighter than its surroundings as shown in FIG. 12A, a part of the line E1, when enlarged, is as shown in FIG. 12B. In an image having a fine slanted line E2 that is one pixel wide and dimmer than its surroundings as shown in FIG. 13A, a part of the line E2, when enlarged, is as shown in FIG. 13B. In either case, the correlations observed in all of the three directions H1, H2, and H3 are equal, and therefore it is impossible to determine the direction in which to effect interpolation. To avoid this, the three directions H1, H2, and H3 are given different degrees of priority so that interpolation is effected in the direction given the highest priority.

Note that, throughout the present specification, "effecting interpolation in a particular direction" denotes adding an interpolated pixel that is produced by using the two adjacent original pixels that face each other across the interpolated pixel in that direction.

As a result, for example, when the direction H1 is given the highest priority, interpolation is effected properly in the case shown in FIG. 12B; however, in the case shown in FIG. 13B, improper interpolation results, because interpolation is effected in the direction H1 where it should be effected in the direction H3.

That is, quite inconveniently, this interpolation method is prone to interpolation errors that occur as a result of interpolation being effected in a direction in which, although the correlation is high, no edge is found. This recognizably degrades the quality of the interpolated image, in particular in terms of the rendering of fine lines, and thus makes it impossible to obtain satisfactorily high resolution in the interpolated image. Note that the direction in which to effect interpolation may be determined by selecting one from among any number of directions greater than three as specifically described above; this, however, increases interpolation errors and thus makes the problem more serious.

SUMMARY OF THE INVENTION

An object of the present invention is to provide an image interpolation device that produces interpolated images with high resolution.

To achieve the above object, according to one aspect of the present invention, an image interpolation device is provided with: absolute difference value calculating means for calculating the absolute value of the difference between two input pixels for each of a plurality of pairs of input pixels that face each other across a to-be-interpolated pixel; edge candidate detecting means for detecting the direction in which the absolute value of the difference between the two input pixels is smallest among a plurality of directions in which the plurality of pairs of input pixels face each other across the to-be-interpolated pixel; edge candidate verifying means for checking whether or not the direction detected by the edge candidate detecting means is a direction in which an edge is found; interpolated pixel value calculating means for calculating the average value of the two input pixels that face each other across the to-be-interpolated pixel in the direction that is recognized by the edge candidate verifying means as a direction in which an edge is found; and interpolating means for determining the value calculated by the interpolated pixel value calculating means as the value of the to-be-interpolated pixel.

Specifically, the edge candidate verifying means may recognize a direction as a direction in which an edge is found if the individual differences of the two input pixels that face each other across the to-be-interpolated pixel in that direction from the input pixels lying adjacently on the identical sides of those two input pixels bear identical signs.

Alternatively, the edge candidate verifying means may recognize a direction as a direction in which an edge is found if the individual differences of the two input pixels that face each other across the to-be-interpolated pixel in that direction from the input pixels that face those two input pixels across and perpendicularly to the line on which the to-be-interpolated pixel lies bear opposite signs.

Alternatively, the edge candidate verifying means may recognize a direction as a direction in which an edge is found if the average value of the two input pixels that face each other across the to-be-interpolated pixel in that direction is nearly equal to at least one of the values of the two input pixels that face each other across the to-be-interpolated pixel and perpendicularly to the line on which the to-beinterpolated pixel lies.

Alternatively, the edge candidate verifying means may recognize a direction as a direction in which an edge is found if the absolute value of the difference between the two input pixels that face each other across the to-be-interpolated pixel and perpendicularly to the line on which the to-be-interpolated pixel lies is greater than or equal to a predetermined value.

In all of these configurations, whether or not the direction in which the highest correlation is observed (i.e. in which the absolute value of the difference between the two adjacent original pixels is smallest) is an edge direction is checked so that interpolation is effected in that direction only when this direction is recognized as an edge direction. This helps reduce interpolation errors that occur as a result of interpolation being effected in a direction in which, although the correlation is high, no edge is found, and thereby improve the quality of the interpolated image, in particular in terms of the rendering of fine lines. Thus, it is possible to obtain high-resolution images.

According to another aspect of the present invention, an image interpolation device is provided with: absolute difference value calculating means for calculating the absolute value of the difference between two input pixels for each of a plurality of pairs of input pixels that face each other across a to-be-interpolated pixel; edge direction checking means for checking, for each of a plurality of directions in which the plurality of pairs of input pixels face each other across the to-be-interpolated pixel, whether an edge is found in that direction or not; edge detecting means for detecting the direction in which an edge is found and in which the absolute value of the difference between the two input pixels is smallest among the plurality of directions in which the plurality of pairs of input pixels face each other across the to-be-interpolated pixel; interpolated pixel value calculating means for calculating the average value of the two input pixels that face each other across the to-be-interpolated pixel in the direction detected by the edge detecting means; and interpolating means for determining the value calculated by the interpolated pixel value calculating means as the value of the to-be-interpolated pixel.

Specifically, the edge direction checking means may recognize a direction as a direction in which an edge is found if the individual differences of the two input pixels that face each other across the to-be-interpolated pixel in that direction from the input pixels lying adjacently on the identical sides of those two input pixels in that direction bear identical signs.

Alternatively, the edge direction checking means may recognize a direction as a direction in which an edge is found if the individual differences of the two input pixels that face each other across the to-be-interpolated pixel in that direction from the input pixels that face those two input pixels across and perpendicularly to the line on which the to-be-interpolated pixel lies bear opposite signs.

Alternatively, the edge direction checking means may recognize a direction as a direction in which an edge is found if the average value of the two input pixels that face each other across the to-be-interpolated pixel in that direction is nearly equal to at least one of the values of the two input pixels that face each other across the to-be-interpolated pixel and perpendicularly to the line on which the to-beinterpolated pixel lies.

Alternatively, the edge direction checking means may recognize a direction as a direction in which an edge is found if the absolute value of the difference between the two input pixels that face each other across the to-be-interpolated in pixel and perpendicularly to the line on which the to-be-interpolated pixel lies is greater than or equal to a predetermined value.

In all of these configurations, interpolation is effected in the direction, among directions recognized as edge directions, in which the highest correlation is observed (i.e. in which the absolute value of the difference between the two adjacent original pixels is smallest). This helps reduce interpolation errors that occur as a result of interpolation being effected in a direction in which, although the correlation is high, no edge is found, and thereby improve the quality of the interpolated image, in particular in terms of the rendering of fine lines. Thus, it is possible to obtain high-resolution images.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
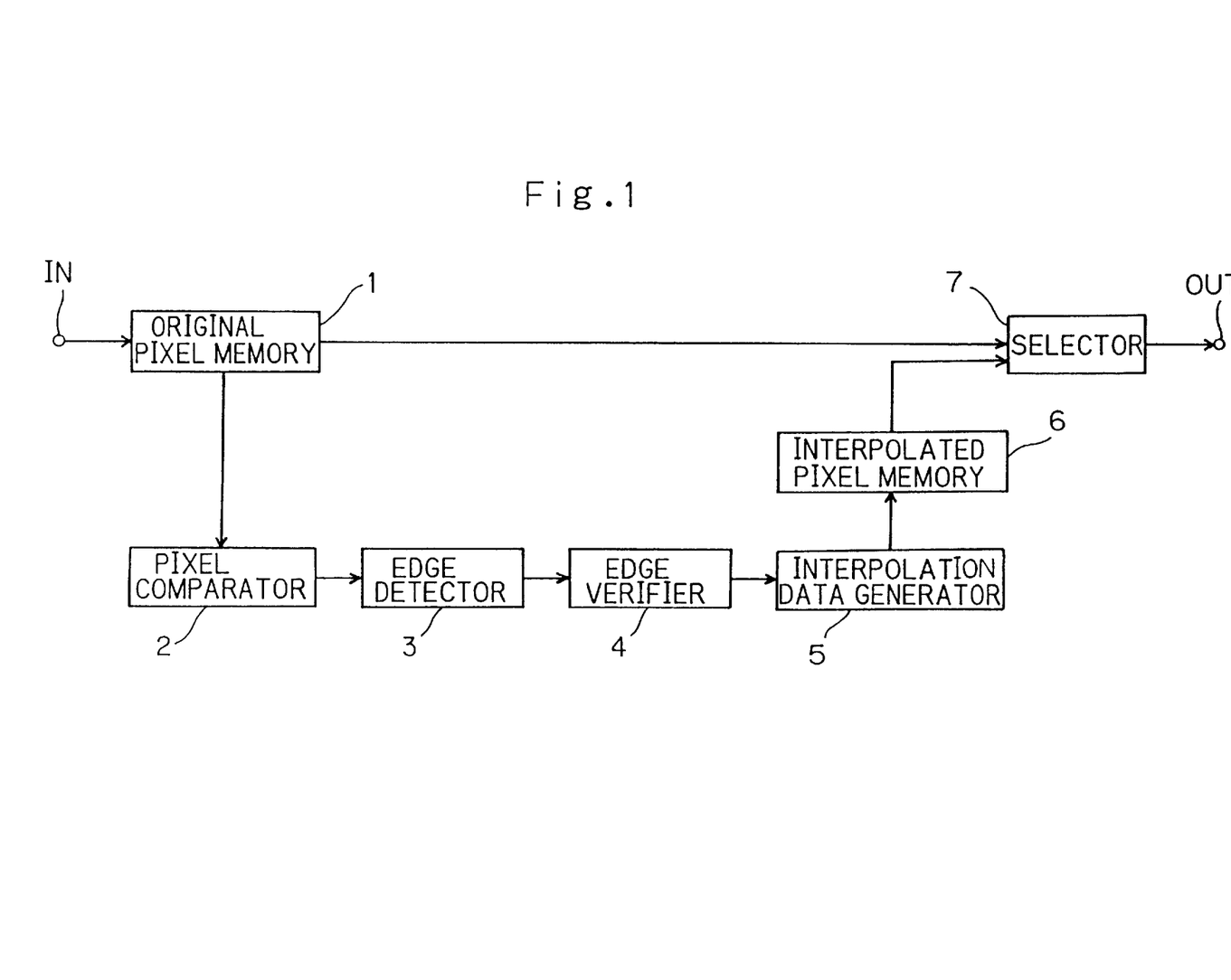
FIG. 1 is a block diagram of the image interpolation device of a first, a second, a third, and a fourth embodiment of the invention.

Hereinafter, embodiments of the present invention will be described with reference to the drawings. FIG. 1 is a block diagram of the image interpolation device of a first embodiment of the invention. In this figure, image data for interlaced scanning is fed in via a terminal IN, and is accumulated in an original pixel memory 1. A pixel comparator 2 calculates the absolute value of the difference between two adjacent original pixels for each of the three pairs of adjacent original pixels facing each other across a pixel to be interpolated (hereafter, such a pixel will be referred to simply as an "interpolated pixel") in three, i.e. one vertical and two diagonal, directions. On the basis of the absolute values of the differences calculated by the pixel comparator 2, an edge detector 3 finds the direction in which the highest correlation is observed among those three directions. Specifically, the direction in which the absolute value of the difference between the two adjacent original pixels is smallest is determined as the direction in which the highest correlation is observed.

An edge verifier 4 performs predetermined calculation using the input pixels lying in the direction found by the edge detector 3, checks whether the result of this calculation fulfills a predetermined condition or not, and, on the basis of the result of this checking, determines the direction in which to effect interpolation. An interpolation data generator 5 calculates the average value of the two adjacent original pixels that face each other across the interpolated pixel in the direction in which the edge verifier 4 has determined to effect interpolation. The average value calculated by the interpolation data generator 5 is accumulated in an interpolated pixel memory 6.

A selector 7 selects alternatively the image data accumulated in the original pixel memory 1 or the image data accumulated in the interpolated pixel memory 6 so that the image data corresponding to one line accumulated in the original pixel memory 1 and the image data corresponding to one line accumulated in the interpolated pixel memory 6 are alternately fed out via a terminal OUT. As a result, the image data fed in as image data for interlaced scanning is fed out as image data for progressive scanning.

Now, how interpolation is effected in the image interpolation device of the first embodiment will be described with reference to the flow chart shown in FIG. 2. For a given interpolated pixel X, a sequence of operations as described below is performed for each of three directions H1, H2, and H3 passing through the interpolated pixel X, as shown in FIG. 11, in the order named. First, the pixel comparator 2 calculates the absolute value of the difference between two adjacent original pixels (step #101).

Figure 3:
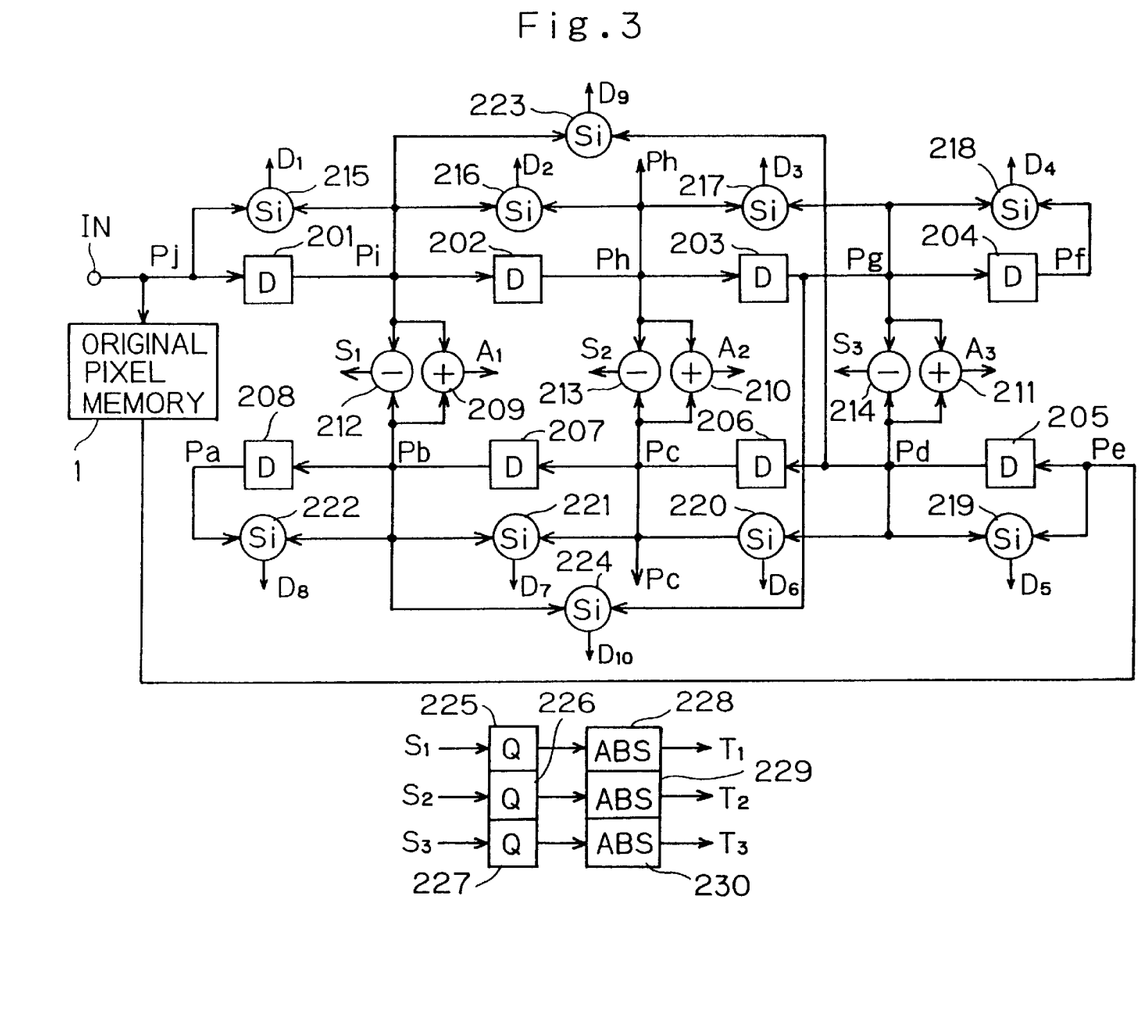
FIG. 3 is a diagram showing the configuration of the pixel comparator.

The internal configuration of the pixel comparator 2 is shown in FIG. 3. Reference numerals 201, 202, 203, 204, 205, 206, 207, and 208 represent delayers that each output the data fed thereto with a delay corresponding to one pixel. Reference numerals 209, 210, and 211 represent adders that each output the sum of the two inputs fed thereto. Reference numerals 212, 213, and 214 represent subtracters that each output the result of subtraction of one input from the other fed thereto. Reference numerals 215, 216, 217, 218, 219, 220, 221, 222, 223, and 224 represent subtraction sign finders that each output a bit representing the sign of the result of subtraction of one input from the other fed thereto. Reference numerals 225, 226, and 227 represent quantifiers that each output the bits fed thereto after compressing them into a predetermined number of bits. Reference numerals 228, 229, and 230 represent absolute value finders that each output the absolute value of the input fed thereto.

The delayer 201 receives the image data fed in to the image interpolation device intact. The output $P_i$ of the delayer 201 is fed to the delayer 202. The output $P_h$ of the delayer 202 is fed to the delayer 203. The output $P_g$ of the delayer 203 is fed to the delayer 204.

The delayer 205 receives the image data fed in to the image interpolation device with a delay corresponding to one line produced by the original pixel memory 1. The output $P_d$ of the delayer 205 is fed to the delayer 206. The output $P_c$ of the delayer 206 is fed to the delayer 207. The output $P_b$ of the delayer 207 is fed to the delayer 208.

The adder 209 receives the output $P_i$ of the delayer 201 and the output $P_b$ of the delayer 207, and yields an output $A_1$ such that $A_1=P_b+P_i$. The adder 210 receives the output $P_h$ of the delayer 202 and the output $P_c$ of the delayer 206, and yields an output $A_2$ such that $A_2=P_c+P_h$. The adder 211 receives the output $P_g$ of the delayer 203 and the output $P_d$ of the delayer 205, and yields an output $A_3$ such that $A_3=P_d+P_g$.

The subtracter 212 receives the output $P_i$ of the delayer 201 and the output $P_b$ of the delayer 207, and yields an output $S_1$ such that $S_1=P_i-P_b$. The subtracter 213 receives the output $P_h$ of the delayer 202 and the output $P_c$ of the delayer 206, and yields an output $S_2$ such that $S_2=P_h-P_c$. The subtracter 214 receives the output $P_g$ of the delayer 203 and the output $P_d$ of the delayer 205, and yields an output $S_3$ such that $S_3=P_g-P_d$.

The subtraction sign finder 215 receives the input $P_j$ of the delayer 201 and the output $P_i$ of the delayer 201, and yields an output bit $D_1$ that represents the sign of $P_j-P_i$. The subtraction sign finder 216 receives the output $P_i$ of the delayer 201 and the output $P_h$ of the delayer 202, and yields an output bit $D_2$ that represents the sign of $P_i-P_h$. The subtraction sign finder 217 receives the output $P_h$ of the delayer 202 and the output $P_g$ of the delayer 203, and yields an output bit $D_3$ that represents the sign of $P_h-P_g$. The subtraction sign finder 218 receives the output $P_g$ of the delayer 203 and the output $P_f$ of the delayer 204, and yields an output bit $D_4$ that represents the sign of $P_g-P_f$. The subtraction sign finder 219 receives the input $P_e$ of the delayer 205 and the output $P_d$ of the delayer 205, and yields an output bit $D_5$ that represents the sign of $P_e-P_d$. The subtraction sign finder 220 receives the output $P_d$ of the delayer 205 and the output $P_c$ of the delayer 206, and yields an output bit $D_6$ that represents the sign of $P_d-P_c$. The subtraction sign finder 221 receives the output $P_c$ of the delayer 206 and the output $P_b$ of the delayer 207, and yields an output bit $D_7$ that represents the sign of $P_c-P_b$. The subtraction sign finder 222 receives the output $P_b$ of the delayer 207 and the output $P_a$ of the delayer 208, and yields an output bit $D_8$ that represents the sign of $P_b-P_a$. The subtraction sign finder 223 receives the output $P_i$ of the delayer 201 and the output $P_d$ of the delayer 205, and yields an output bit $D_9$ that represents the sign of $P_i-P_d$. The subtraction sign finder 224 receives the output $P_g$ of the delayer 203 and the output $P_b$ of the delayer 207, and yields an output bit $D_{10}$ that represents the sign of $P_g-P_b$.

The quantifiers 225, 226, and 227 receive the outputs $S_1$, $S_2$, and $S_3$ of the subtracters 212, 213, and 214, respectively. The outputs of the quantifiers 225, 226, and 227 are fed to the absolute value finders 228, 229, and 230, respectively. The outputs $T_1$, $T_2$, and $T_3$ of the absolute value finders 228, 229, and 230 are fed individually to the edge detector 3.

Then, the edge detector 3 performs the following sequence of operations. First, whether the absolute value of the difference calculated in #101 is less than or equal to a threshold value or not is checked (#102). If so (Y in #102), whether the absolute value of the difference calculated in

101 is less than the value stored as the smallest value or not is checked (#103), and otherwise (N in #102) the operation flow returns to #101 to proceed to the processing of the next direction. Note that the operation in #102 may be omitted.

If the result of the check in #103 is positive (Y in #103), the direction currently processed is stored as the most likely candidate for a direction in which an edge is found (hereafter referred to simply as the "edge candidate") in place of the already stored direction (#104), and simultaneously the absolute value of the difference calculated in #101 is stored as the smallest value in place of the already stored value (#105). After the execution of #105, the operation flow returns to #101 to proceed to the processing of the next direction. On the other hand, if the result of the check in #103 is negative (N in #103), the operation flow skips #104 and #105, and returns to #101 to proceed to the processing of the next direction.

Here, before performing the above-described sequence of operations for the next interpolated pixel, the value stored as the smallest value in the edge detector 3 is cleared, and the direction stored as the edge candidate therein is initialized to the vertical direction (the direction H1) (#100). In the example described above, the directions H1, H2, and H3 are processed in this order; however, it is also possible to process them concurrently.

In the example described above, the direction stored as the edge candidate in the edge detector 3 is initialized to the direction H1 before the above-described sequence of operations is performed for the next interpolated pixel; however, it is also possible to determine the direction to which to initialize it in accordance with the type of the image processed, for example by initializing it to the direction H1 when edges are found predominantly in the vertical direction, to the direction H2 when edges are found predominantly in oblique directions running from bottom left to top right, and to the direction H3 when edges are found predominantly in oblique directions running from bottom right to top left.

Thus, when the operations in #101 to #105 described above have been completed with respect to a given interpolated pixel, in the edge detector 3 is stored, as the edge candidate, the direction in which the absolute value of the difference between the two adjacent original pixels that face each other across that interpolated pixel is smallest, i.e. the direction in which the highest correlation is observed.

Figure 4:
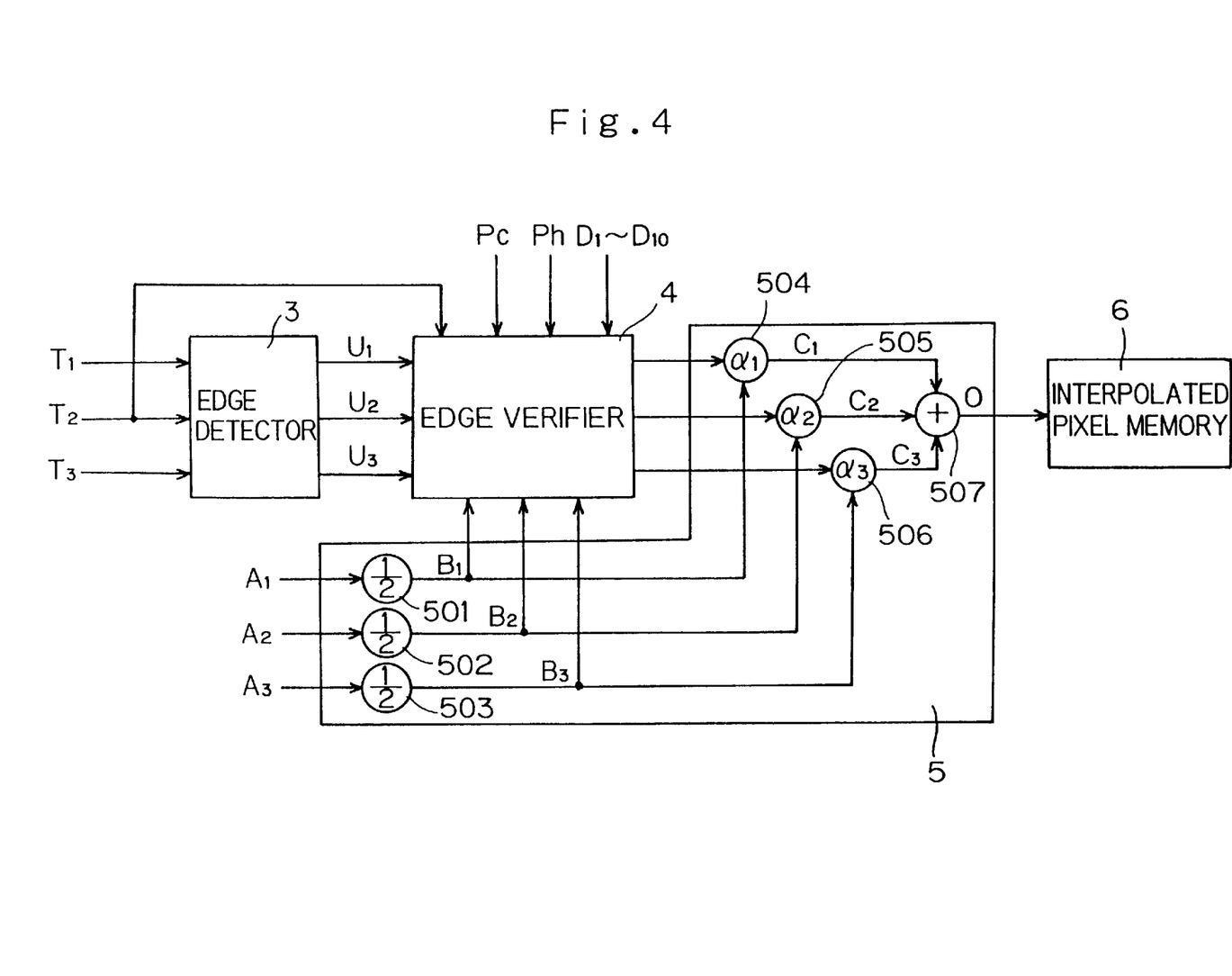
FIG. 4 is a diagram illustrating the operation of the edge detector, edge verifier, and interpolation data generator.

In an arrangement where the edge detector 3 performs the above-described sequence of operations concurrently for the three directions H1, H2, and H3, the processing proceeds as follows. As shown in FIG. 4, the edge detector 3 receives the outputs $T_1$, $T_2$, and $T_3$ of the absolute value finder 228, 229, and 230 of the pixel comparator 2 shown in FIG. 3. The edge detector 3 finds the smallest among the three inputs $T_1$, $T_2$, and $T_3$ fed thereto, and it turns its three output bits $U_1$, $U_2$, and $U_3$ to 1, 0, and 0, respectively, when the input $T_1$ is smallest, to 0, 1, 0 when the input $T_2$ is smallest, and to 0, 0, and 1 when the input $T_3$ is smallest. If more than one input is found to be smallest, all the output bits corresponding to the inputs that are smallest is turned to 1. Alternatively, it is also possible to turn the output bit corresponding to an input that is smallest to 1 only when this smallest value is less than a threshold value.

After the operations in #101 to #105 described above have been completed with respect to a given interpolated pixel, the edge verifier 4 performs the following sequence of operations. The edge verifier 4 performs predetermined calculation using the input pixels lying in the direction stored as the edge candidate in the edge finder 3, and then, by checking whether or not the result of this calculation fulfills a predetermined condition for recognizing an edge (hereafter referred to as the "edge condition"), checks whether or not the direction stored as the edge candidate in the edge finder 3 is a direction in which an edge is found (hereafter referred to as an "edge direction") (#106).

If the result of the check in #106 is positive (Y in #106), the operation flow proceeds directly to #108. If the result of the check in #106 is negative (N in #106), the vertical direction (the direction H1) is stored as the edge candidate (#107).

When performing this sequence of operations, the edge verifier 4 operates as follows. As shown in FIG. 4, the edge verifier 4 receives from the pixel comparator 2 shown in FIG. 3 the outputs $D_1$, $D_2$, $D_3$, $D_4$, $D_5$, $D_6$, $D_7$, $D_8$, $D_9$, and $D_{10}$ of the subtraction sign finder 215, 216, 217, 218, 219, 220, 221, 222, 223, and 224, respectively, the outputs $P_c$ and $P_h$ of the delayers 202 and 206, respectively, and the output $T_2$ of the absolute value finder 229, receives from the edge finder 3 the output bits $U_1$, $U_2$, and $U_3$ thereof, and receives from the interpolation data generator 5 the outputs $B_1$, $B_2$, and $B_3$ of the later-described ½ multipliers 501, 502, and 503, respectively, provided therein.

The edge verifier 4 recognizes the direction of the edge candidate by checking which of the three bits $U_1$, $U_2$, and $U_3$ output from the edge detector 3 is 1, and checks whether or not the direction of the edge candidate fulfills the later described edge condition on the basis of the outputs $D_1$, $D_2$, $D_3$, $D_4$, $D_5$, $D_6$, $D_7$, $D_8$, $D_9$, and $D_{10}$ of the subtraction sign finder 215, 216, 217, 218, 219, 220, 221, 222, 223, and 224, respectively, the outputs $P_c$ and $P_h$ of the delayers 202 and 206, respectively, and the output $T_2$ of the absolute value finder 229 fed from the pixel comparator 2 shown in FIG. 3 and the outputs $B_1$, $B_2$, and $B_3$ of the later-described ½ multipliers 501, 502, and 503, respectively, fed from the interpolation data generator 5. Then, in accordance with the result of this checking, the edge verifier 4 sets the factors $\alpha_1$, $\alpha_2$, and $\alpha_3$ used in the later-described multipliers 504, 505, and 506 provided in the interpolation data generator 5.

Specifically, for example, when the output bits $U_1$, $U_2$, and $U_3$ of the edge detector 3 are 1, 0, and 0, respectively and in addition the edge condition is fulfilled, the factors $\alpha_1$, $\alpha_2$, and $\alpha_3$ used in the multipliers 504, 505, and 506 are set at 1, 0, and 0, respectively; when more then one of the output bits $U_1$, $U_2$, and $U_3$ of the edge detector 3 is 1, or when the edge condition is not fulfilled, the factors $\alpha_1$, $\alpha_2$, and $\alpha_3$ used in the multipliers 504, 505, and 506 are set at 0, 1, and 0, respectively, in this embodiment.

Then, the interpolation data generator 5 calculates the average value of the two adjacent original pixels that lie in the direction stored as the edge candidate in the edge verifier 4 (#108), and stores the calculated average value as the value of the interpolated pixel in the interpolated pixel memory 6 (#109). The sequence of operations #101 to #109 described above is repeated for each interpolated pixel.

To achieve the operations described above, the interpolation data generator 5 is configured as shown in FIG. 4. Reference numerals 501, 502, and 503 represent ½ multipliers that each output the input fed thereto after multiplying it by a factor of ½. Reference numerals 504, 505, and 506 represent multipliers that each output the input fed thereto after multiplying it by a factor $\alpha_1$, $\alpha_2$, or $\alpha_3$, respectively, set by the edge verifier 4. Reference numeral 507 is an adder that outputs the sum of the three inputs fed thereto.

The ½ multipliers 501, 502, and 503 receive the outputs $A_1$, $A_2$, and $A_3$ of the adders 209, 210, and 211, respectively, of the pixel comparator 2 shown in FIG. 3. The outputs $B_1(=A_1/2)$, $B_2(=A_2/2)$, and $B_3(=A_3/2)$ of the ½ multipliers 501, 502, and 503, respectively, are fed to the multipliers 504, 505, and 506, and are fed also to the edge verifier 4. The outputs $C_1(=\alpha_1 \times B_1)$, $C_2(=\alpha_2 \times B_2)$, and $C_3(=\alpha_3 \times B_3)$ of the multipliers 504, 505, and 506, respectively, are fed to the adder 507. The output O of the adder 507 $(=C_1+C_2+C_3)$ is accumulated in the interpolated pixel memory 6.

Now, the edge condition used in #106 will be described. In this embodiment, the edge condition (called the first edge condition) requires that, with respect to the two adjacent original pixels, called the first and second pixels respectively, that face each other across a given interpolated pixel in the direction in which the highest correlation is observed, the sign (+, −, or 0) of the difference obtained by subtracting the value of the pixel lying adjacently on the left of the first pixel from the value of the first pixel be identical with the sign of the difference obtained by subtracting the value of the pixel lying adjacently on the left of the second pixel from the value of the second pixel, or that the sign of the difference obtained by subtracting the value of the pixel lying adjacently on the right of the first pixel from the value of the first pixel be identical with the sign of the difference obtained by subtracting the value of the pixel lying adjacently on the right of the second pixel from the value of the second pixel.

Figure 5:
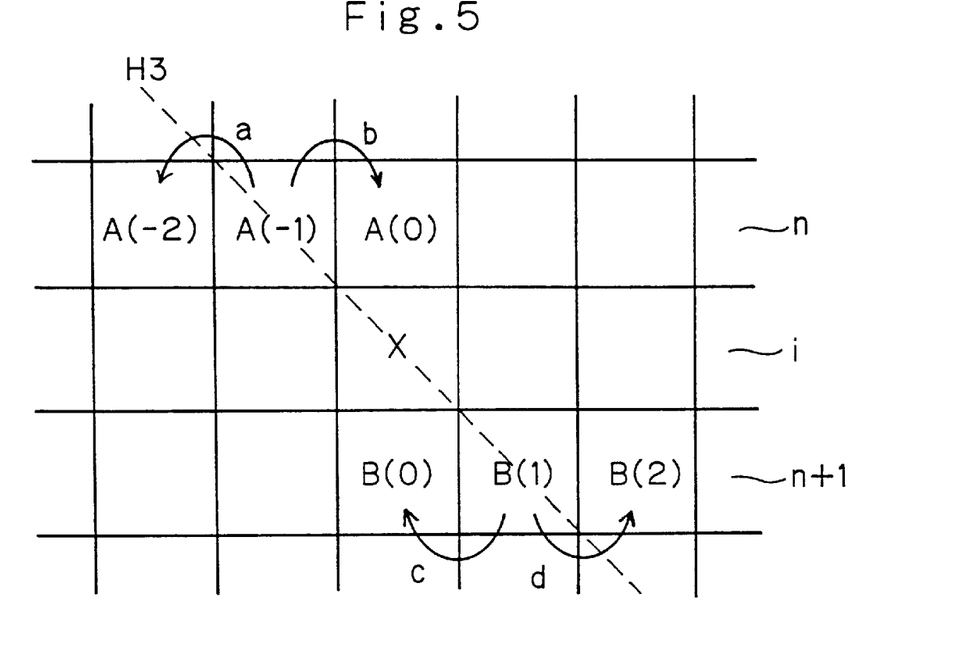
FIG. 5 is a diagram illustrating the condition for recognizing an edge in the first and a fifth embodiment of the invention.

For example, suppose that, as shown in FIG. 5, the highest correlation is observed in the direction H3 passing through the interpolated pixel X, and assume that, with respect to the two adjacent original pixels A(−1) and B(1) lying in that direction H3, the two adjacent original pixels A(−2) and B(0) lying adjacently on the left of the adjacent original pixels A(−1) and B(1), respectively, and the two adjacent original pixels A(0) and B(2) lying adjacently on the right of the adjacent original pixels A(−1) and B(1), respectively, the signs of the differences A(−1)−A(−2), A(−1)−A(0), B(1)−B(0), and B(1)−B(2) are represented by a, b, c, and d, respectively. Then, if a=c or b=d, then the edge condition is fulfilled.

Alternatively, the edge condition may require that, with respect to the two adjacent original pixels, called the first and second pixels respectively, that face each other across a given interpolated pixel in the direction in which the highest correlation is observed, the sign of the difference obtained by subtracting the value of the pixel lying adjacently on the left of the first pixel from the value of the first pixel be identical with the sign of the difference obtained by subtracting the value of the pixel lying adjacently on the left of the second pixel from the value of the second pixel, and simultaneously that the sign of the difference obtained by subtracting the value of the pixel lying adjacently on the right of the first pixel from the value of the first pixel be identical with the sign of the difference obtained by subtracting the value of the pixel lying adjacently on the right of the second pixel from the value of the second pixel.

Figure 2:
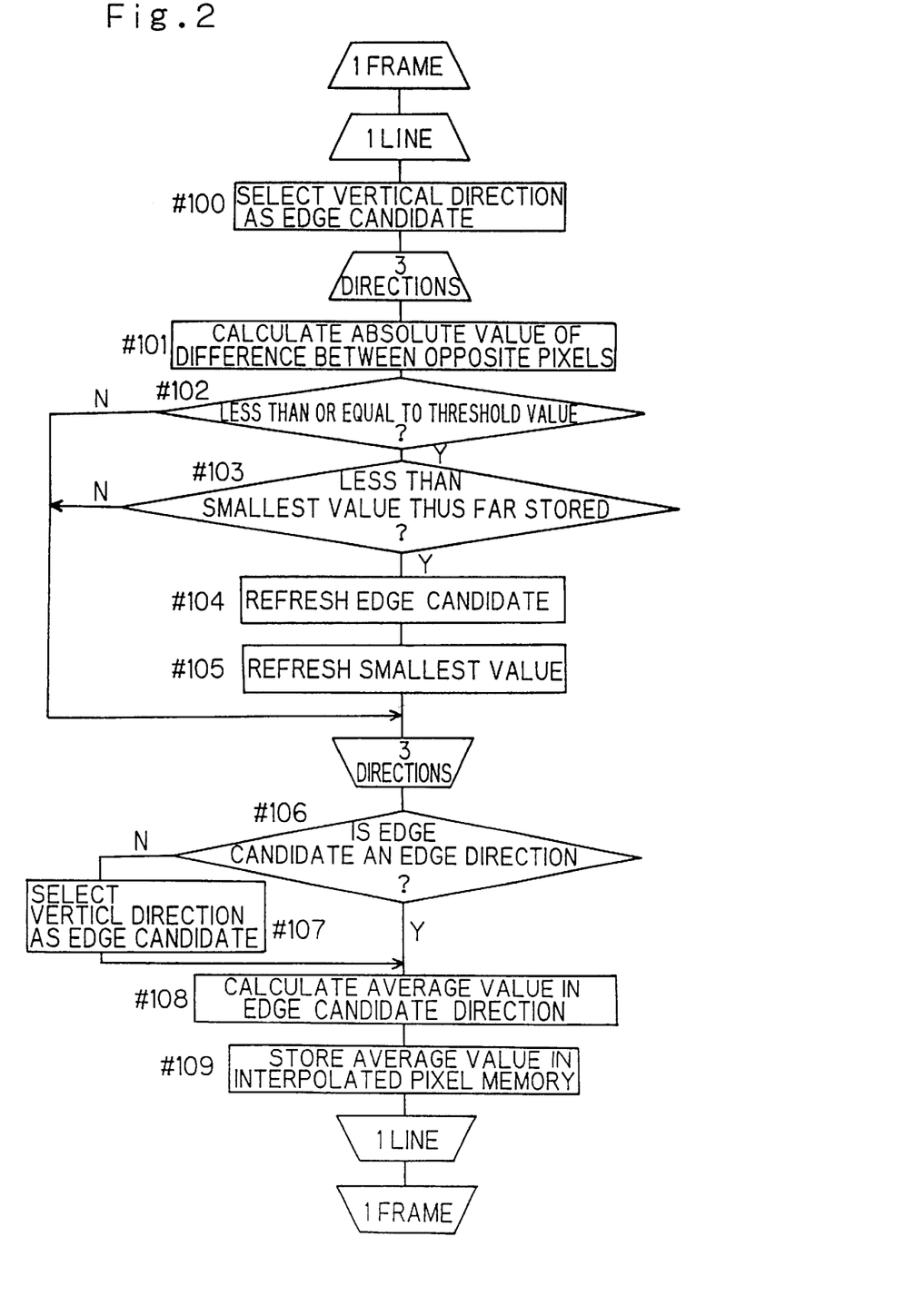
FIG. 2 is a flow chart showing how interpolation is effected in the image interpolation device of the first, second, third, and fourth embodiments.

The image interpolation device of a second embodiment of the invention has the same configuration as the image interpolation device of the first embodiment described above, and achieves interpolation by performing the same sequence of operations as shown in the flow chart of FIG. 2. The only difference is that, in this embodiment, the edge condition (called the second edge condition) used in #106 requires that, with respect to the two adjacent original pixels, called the first and second pixels respectively, that face each other across a given interpolated pixel in the direction in which the highest correlation is observed, the sign (+, −, or 0) of the difference obtained by subtracting the value of the adjacent original pixel that faces the first pixel across and perpendicularly to the line on which the interpolated pixel lies from the value of the first pixel be not identical with the sign of the difference obtained by subtracting the value of the adjacent original pixel that faces the second pixel across and perpendicularly to the line on which the interpolated pixel lies from the value of the second pixel.

Figure 6:
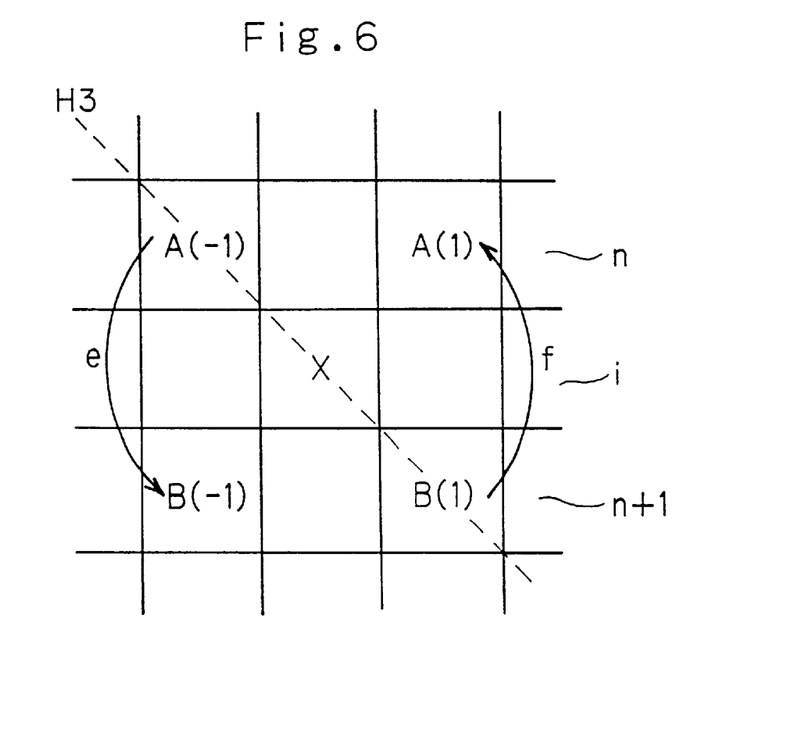
FIG. 6 is a diagram illustrating the condition for recognizing an edge in the second and a sixth embodiment of the invention.

For example, suppose that, as shown in FIG. 6, the highest correlation is observed in the direction H3 passing through the interpolated pixel X, and assume that, with respect to the two adjacent original pixels A(−1) and B(1) lying in that direction H3 and the two adjacent original pixels B(−1) and A(1) facing the adjacent original pixels A(−1) and B(1), respectively, across and perpendicularly to the line i on which the interpolated pixel X lies, the signs of the differences A(−1)−B(−1) and B(1)−A(1) are represented by e and f, respectively. Then, if $$e \neq f,$$

then the edge condition is fulfilled.

The image interpolation device of a third embodiment of the invention has the same configuration as the image interpolation device of the first embodiment described above, and achieves interpolation by performing the same sequence of operations as shown in the flow chart of FIG. 2. The only difference is that, in this embodiment, the edge condition (called the third edge condition) used in #106 requires that, with respect to the two adjacent original pixels, called the first and second pixels respectively, that face each other across a given interpolated pixel in the direction in which the highest correlation is observed, the average value of the values of the first and second pixels be nearly equal to at least one of the values of the two adjacent original pixels that face each other across the interpolated pixel X in the vertical direction (the direction H1).

Figure 7:
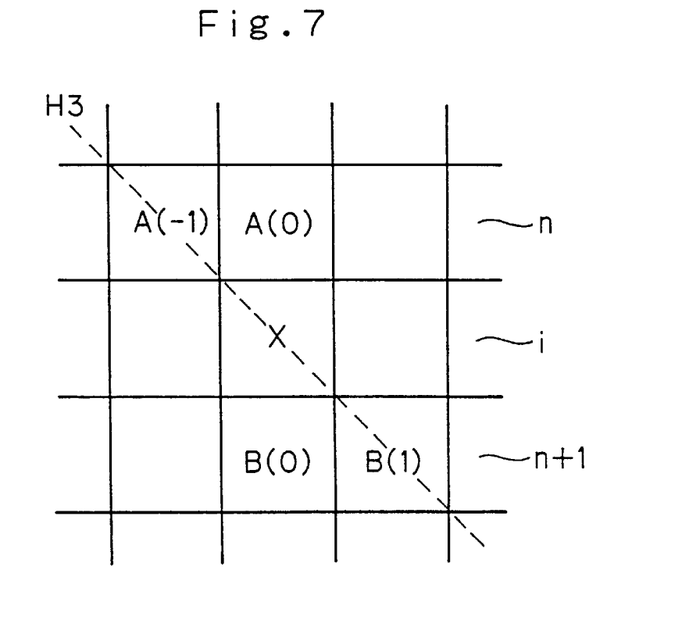
FIG. 7 is a diagram illustrating the condition for recognizing an edge in the third and a seventh embodiment of the invention.

For example, suppose that, as shown in FIG. 7, the highest correlation is observed in the direction H3 passing through the interpolated pixel X. Then, with respect to the two adjacent original pixels A(−1) and B(1) lying in that direction H3 and the two adjacent original pixels A(0) and B(0) facing each other across the interpolated pixel X in the vertical direction, if $$\{A(-1)+B(1)\}/2 \approx A(0), \text{ or}$$

$$\{A(-1)+B(1)\}/2 \approx B(0),$$

then the edge condition is fulfilled.

The image interpolation device of a fourth embodiment of the invention has the same configuration as the image interpolation device of the first embodiment described above, and achieves interpolation by performing the same sequence of operations as shown in the flow chart of FIG. 2. The only difference is that, in this embodiment, the edge condition (called the fourth edge condition) used in #106 requires that, irrespective of in which direction the highest correlation is observed among the three directions passing through the interpolated pixel, the absolute value of the difference between the two adjacent original pixels facing each other across the interpolated pixel in the vertical direction be greater than or equal to a threshold value.

Figure 8:
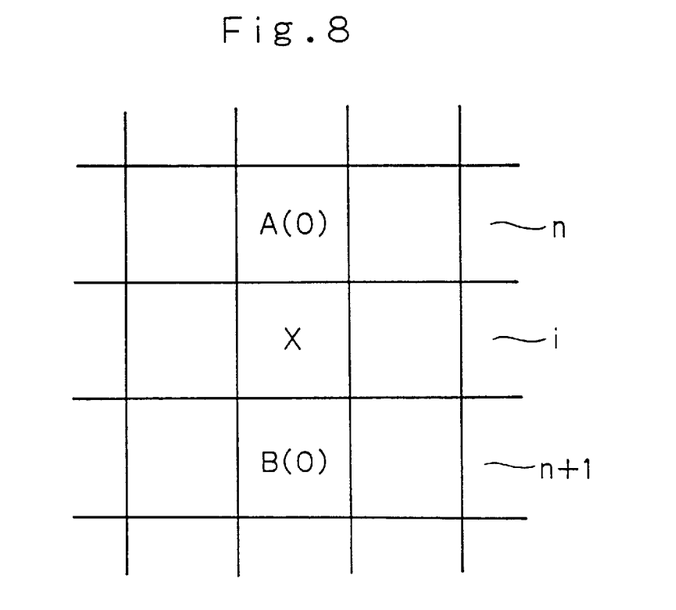
FIG. 8 is a diagram illustrating the condition for recognizing an edge in the fourth and an eighth embodiment of the invention.

Specifically, as shown in FIG. 8, with respect to the two adjacent original pixels A(0) and B(0) facing each other across the interpolated pixel X in the vertical direction, if $$|A(0)-B(0)| \geq \text{Threshold Value},$$

then the edge condition is fulfilled.

The image interpolation devices of the first, second, third, and fourth embodiments described above perform the sequence of operations as described above to check whether or not the direction in which the highest correlation is observed (i.e. in which the absolute value of the difference between the two adjacent original pixels is smallest) is an edge direction so that interpolation is effected in that direction only when this direction is recognized as an edge direction. This helps reduce interpolation errors that occur as a result of interpolation being effected in a direction in which, although the correlation is high, no edge is found, and thereby improve the quality of the interpolated image, in particular in terms of the rendering of fine lines.

It is also possible to use as the edge condition a combination of more than one of the first, second, third, and fourth edge conditions described above and check whether or not this composite condition is fulfilled by the direction in which the absolute value of the difference is smallest. This helps further reduce interpolation errors that occur as a result of interpolation being effected in a direction in which, although the correlation is high, no edge is found, and thereby further improve the quality of the interpolated image, in particular in terms of the rendering of fine lines.

Figure 9:
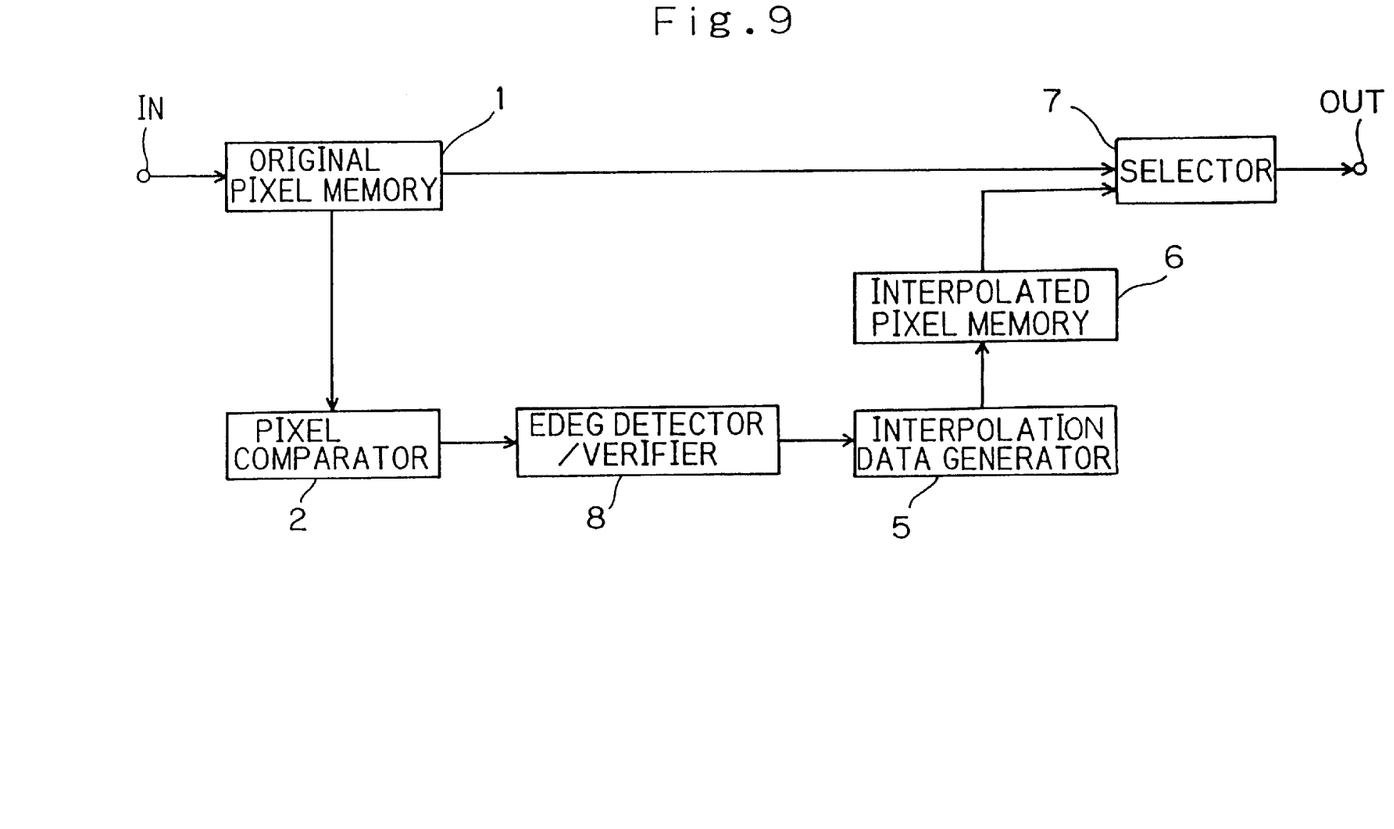
FIG. 9 is a block diagram of the image interpolation device of the fifth, sixth, seventh, and eighth embodiments.

FIG. 9 shows a block diagram of the image interpolation device of a fifth embodiment of the invention. In this figure, an edge detector/verifier 8 performs predetermined calculation using input pixels lying in each of the three directions on the basis of the absolute value of the difference calculated by the pixel comparator 2, and, by checking whether or not the result of this calculation fulfills a predetermined condition, detects the direction in which an edge is found and in addition the absolute value of the difference is smallest among the three directions. Here, such components as are found also in the image interpolation device of the first embodiment described above and shown in FIG. 1 are identified with the same reference numerals, and their descriptions will not be repeated.

Now, how interpolation is effected in the image interpolation device of the fifth embodiment will be described with reference to the flow chart shown in FIG. 10. For a given interpolated pixel X, a sequence of operations as described below is performed for each of three directions H1, H2, and H3 passing through the interpolated pixel X, as shown in FIG. 11, in the order named. First, the pixel comparator 2 calculates the absolute value of the difference between two adjacent original pixels (step #201).

Then, the edge detector/verifier 8 performs the following sequence of operations. First, whether the absolute value of the difference calculated in #201 is less than or equal to a threshold value or not is checked (#202). If so (Y in #202), whether the absolute value of the difference calculated in #201 is less than the value stored as the smallest value or not is checked (#203), and otherwise (N in #202) the operation flow returns to #201 to proceed to the processing of the next direction. Note that the operation in #202 may be omitted.

If the result of the check in #203 is positive (Y in #203), predetermined calculation is performed using input pixels lying in the direction currently processed, and, by checking whether the result of this calculation fulfills an edge condition or not, whether the direction currently processed is an edge direction or not is checked (#204). On the other hand, if the result of the check in #203 is negative (N in #203), the operation flow returns to #201 to proceed to the processing of the next direction. Here, the edge condition used in #204 is the first edge condition.

If the result of the check in #204 is positive (Y in #204), the direction currently processed is stored as the edge candidate in place of the already stored direction (#205), and simultaneously the absolute value of the difference calculated in #201 is stored as the smallest value in place of the already stored value (#206). After the execution of #206, the operation flow returns to #201 to proceed to the processing of the next direction.

Here, before performing the above-described sequence of operations for the next interpolated pixel, the value stored as the smallest value in the edge detector/verifier 8 is cleared, and the direction stored as the edge candidate therein is initialized to the vertical direction (the direction H1) (#200). In the example described above, the directions H1, H2, and H3 are processed in this order; however, it is also possible to process them concurrently.

In the example described above, the direction stored as the edge candidate in the edge detector/verifier 8 is initialized to the direction H1 before the abovedescribed sequence of operations is performed for the next interpolated pixel; however, it is also possible to determine the direction to which to initialize it in accordance with the type of the image processed, for example by initializing it to the direction H1 when edges are found predominantly in the vertical direction, to the direction H2 when edges are found predominantly in oblique directions running from bottom left to top right, and to the direction H3 when edges are found predominantly in oblique directions running from bottom right to top left.

Thus, when the operations in #201 to #206 described above have been completed with respect to a given interpolated pixel, in the edge detector/verifier 8 is stored, as the edge candidate, the direction, among directions that are recognized as edge directions with respect to that interpolated pixel, in which the absolute value of the difference between the two adjacent original pixels is smallest.

After the operations in #201 to #206 described above have been completed with respect to a given interpolated pixel, the interpolation data generator 5 calculates the average value of the two adjacent original pixels that lie in the direction stored as the edge candidate in the edge detector/verifier 8 (#207), and stores the calculated average value as the value of the interpolated pixel in the interpolated pixel memory 6 (#208). If no direction is recognized as an edge direction, interpolation is effected in the direction H1 in this example. The sequence of operations #201 to #208 described above is repeated for each interpolated pixel.

Figure 10:
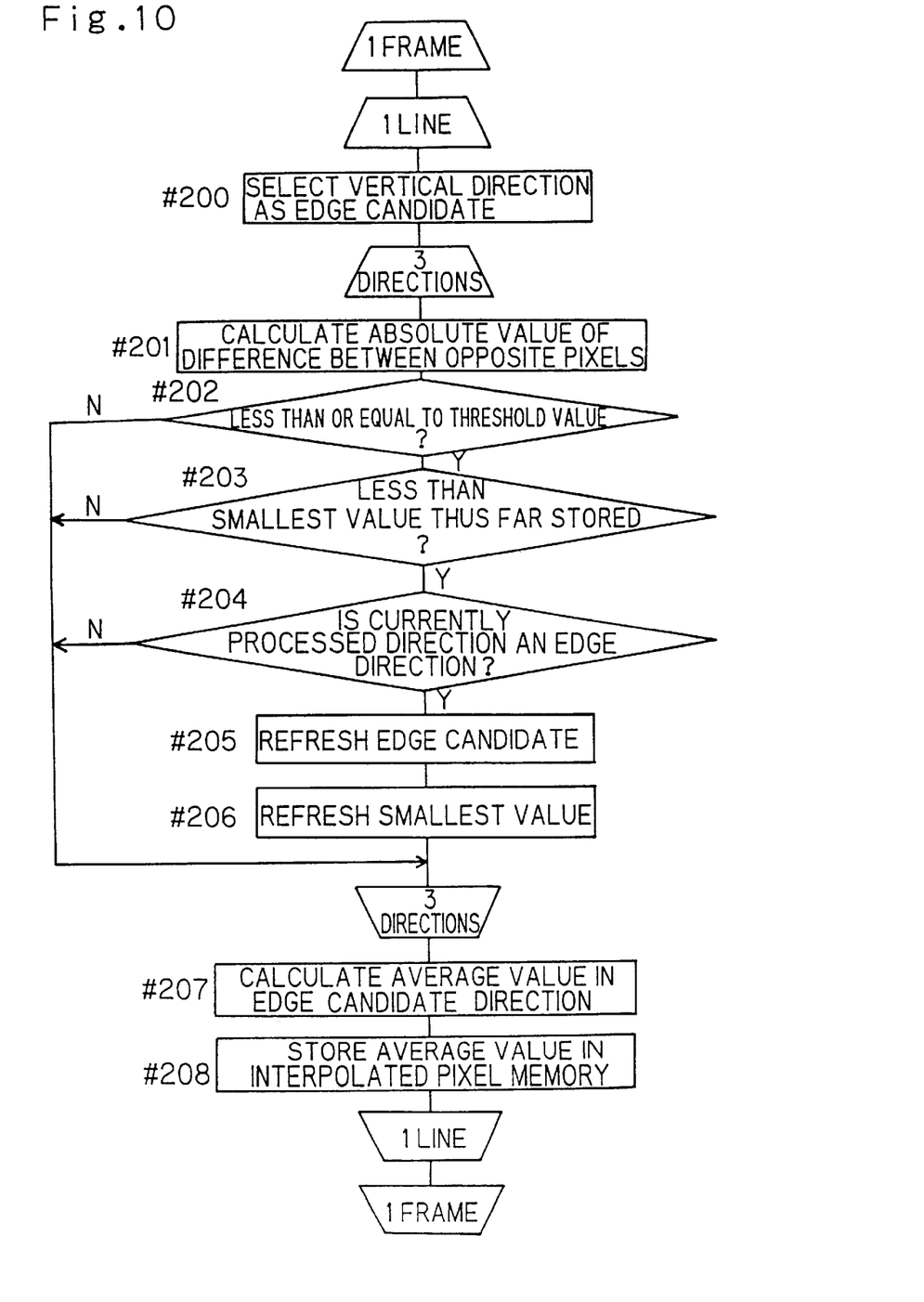
FIG. 10 is a flow chart showing how interpolation is effected in the image interpolation device of the fifth, sixth, seventh, and eighth embodiments.

The image interpolation device of a sixth embodiment of the invention has the same configuration as the image interpolation device of the fifth embodiment described above, and achieves interpolation by performing the same sequence of operations as shown in the flow chart of FIG. 10. The only difference is that, in this embodiment, the edge condition used in #204 is the second edge condition.

The image interpolation device of a seventh embodiment of the invention has the same configuration as the image interpolation device of the fifth embodiment described above, and achieves interpolation by performing the same sequence of operations as shown in the flow chart of FIG. 10. The only difference is that, in this embodiment, the edge condition used in #204 is the third edge condition.

The image interpolation device of an eighth embodiment of the invention has the same configuration as the image interpolation device of the fifth embodiment described above, and achieves interpolation by performing the same sequence of operations as shown in the flow chart of FIG. 10. The only difference is that, in this embodiment, the edge condition used in #204 is the fourth edge condition.

The image interpolation devices of the fifth, sixth, seventh, and eighth embodiments described above perform the sequence of operations as described above to effect interpolation in the direction, among directions recognized as edge directions, in which the highest correlation is observed (i.e. in which the absolute value of the difference between the two adjacent original pixels is smallest). This helps reduce interpolation errors that occur as a result of interpolation being effected in a direction in which, although the correlation is high, no edge is found, and thereby improve the quality of the interpolated image, in particular in terms of the rendering of fine lines.

It is also possible to use as the edge condition a combination of more than one of the first, second, third, and fourth edge conditions described above and effect interpolation in the direction, among directions fulfilling this composite condition, in which the absolute value of the difference between the two adjacent original pixels is smallest. This helps further reduce interpolation errors that occur as a result of interpolation being effected in a direction in which, although the correlation is high, no edge is found, and thereby further improve the quality of the interpolated image, in particular in terms of the rendering of fine lines.

In any of the image interpolation devices of the embodiments described above, the direction in which to effect interpolation may be determined on the basis of brightness data, primary-color data, or color-difference data. Alternatively, as a simplified method, it is also possible even to use only the values of green pixels, to which the human eye is most sensitive.

All of the embodiments described above deal with cases where the image interpolation device is used to convert an image for interlaced scanning into an image for progressive scanning. However, the present invention is applicable not only to such cases but also to cases where an image is enlarged, or an image is converted into an image of a higher resolution.

All of the embodiments described above deal with cases where the image interpolation device operates in such a way as to increase the number of lines. However, it is also possible to increase instead the number of pixels per line by performing the same sequence of operations with all directions rotated through 90°.

All of the embodiments described above deal with cases where the image interpolation device determines the direction in which to effect interpolation by selecting from among three directions. However, it is also possible to select from among more than three directions. The greater the number of directions from which to select the direction in which to effect interpolation, the greater the effect of the present invention.

What is claimed is:

1. An image interpolation device comprising:
   absolute difference value calculating means for calculating an absolute value of a difference between two input pixels for each of a plurality of pairs of input pixels that face each other across a to-be-interpolated pixel;
   edge candidate detecting means for detecting a direction in which the absolute value of the difference between the two input pixels is smallest among a plurality of directions in which the plurality of pairs of input pixels face each other across the to-be-interpolated pixel;
   edge candidate verifying means for checking whether or not the direction detected by the edge candidate detecting means is a direction in which an edge is found;
   interpolated pixel value calculating means for calculating an average value of the two input pixels that face each other across the to-be-interpolated pixel in the direction that is recognized by the edge candidate verifying means as a direction in which an edge is found; and
   interpolating means for determining the value calculated by the interpolated pixel value calculating means as a value of the to-be-interpolated pixel.

2. An image interpolation device as claimed in claim 1, wherein the edge candidate verifying means recognizes a direction as a direction in which an edge is found individual calculated values obtained by subtracting individual values of input pixels lying adjacently on identical sides of the two input pixels that face each other across the to-be-interpolated pixel in that direction from individual values of those two input pixels bear indentical signs.

3. An image interpolation device as claimed in claim 1, wherein the edge candidate verifying means recognizes a direction as a direction in which an edge is found if individual calculated values obtained by subtracting individual values of input pixels that face the two input pixels across and perpendicular to a line on which the to-be-interpolated pixels lies, from individual values of those two input pixels that face each other across the to-be-interpolated pixel in that direction bear opposite signs.

4. An image interpolation device as claimed in claim 1, wherein the edge candidate verifying means recognizes a direction as a direction in which an edge is found if an average value of the two input pixels that face each other across the to-be-interpolated pixel in that direction is nearly equal to at least one of values of the two input pixels that face each other across the to-be-interpolated pixel and perpendicularly to a line on which the to-be-interpolated pixel lies.

5. An image interpolation device as claimed in claim 1, wherein the edge candidate verifying means recognizes a direction as a direction in which an edge is found if the absolute value of the difference between the two input pixels that face each other across the to-be-interpolated pixel and perpendicularly to a line on which the to-be-interpolated pixel lies is greater than or equal to a predetermined value.

6. An image interpolation device as claimed in claim 1, wherein, when the direction detected by the edge candidate detecting means is recognized by the edge candidate verifying means as not a direction in which an edge is found, the interpolated pixel value calculating means calculates an average value of the two input pixels that face each other across the to-be-interpolated pixel in a predetermined direction.

7. An image interpolation device as claimed in claim 6, wherein, when the direction detected by the edge candidate detecting means is recognized by the edge candidate verifying means as not a direction in which an edge is found, a direction in which the interpolated pixel value calculating means calculates the average value of two input pixels that face each other across the to-be-interpolated pixel is determined in accordance with a type of an image processed.

8. An image interpolation device as claimed in claim 1, wherein, when a plurality of directions are detected by the edge candidate detecting means, the interpolated pixel value calculating means calculates an average value of the two input pixels that face each other across the to-be-interpolated pixel in a predetermined direction.

9. An image interpolation device as claimed in claim 1, wherein the edge candidate verifying means does not recognize a direction as a direction in which an edge is found unless the absolute value of the difference between the two input pixels that face each other across the to-be-interpolated pixel in that direction is less than or equal to a predetermined value.

10. An image interpolation device comprising:

absolute difference value calculating means for calculating an absolute value of a difference between two input pixels for each of a plurality of pairs of input pixels that face each other across a to-be-interpolated pixel;

edge direction checking means for checking, for each of a plurality of directions in which the plurality of pairs of input pixels face each other across the to-be-interpolated pixel, whether an edge is found in that direction or not;

edge detecting means for detecting a direction in which an edge is found and in which the absolute value of the difference between the two input pixels is smallest among tho plurality of directions in which the plurality of pairs of input pixels face each other across the to-be-interpolated pixel;

interpolated pixel value calculating means for calculating an average value of the two input pixels that face each other across the to-be-interpolated pixel in the direction detected by the edge detecting means; and interpolating means for determining the value calculated by the interpolated pixel value calculating means as a value of the to-be-interpolated pixel.

11. An image interpolation device as claimed in claim 10, wherein the edge direction checking means recognizes a direction as a direction in which an edge is found if individual calculated values obtain by subtracting individual values of input pixels lying adjacently on identical sides of the two input pixels that face other across the to-be-interpolated pixel in that direction from individual values of those two input pixels bear identical signs.

12. An image interpolation device as claimed in claim 10, wherein the edge direction checking means recognizes a direction as a direction in which an edge is found if individual calculated values obtained by subtracting individual values of input pixels that face the two input pixels across and perpendicularly to a line on which the to-be-interpolated pixels lies, from individual values of those two input pixels that face each other across the to-be-interpolated pixel in that direction bear opposite signs.

13. An image interpolation device as claimed in claim 10, wherein the edge direction checking means recognize a direction as a direction in which an edge is found if an average value of the two input pixels that face each other across the to-be-interpolated pixel in that direction is nearly equal to at least one of values of the two input pixels that face each other across the to-be-interpolated pixel and perpendicularly to a line on which the to-be-interpolated pixel lies.

14. An image interpolation device as claimed in claim 10, wherein the edge direction checking means recognizes a direction as a direction in which an edge is found if the absolute value of the difference between the two input pixels that face each other across the to-be-interpolated pixel and perpendicularly to a line on which the to-be-interpolated pixel lies is greater than or equal to a predetermined value.

15. An image interpolation device as claimed in claim 10, wherein, when no direction is recognized by the edge direction checking means as a direction in which an edge is found, the interpolated pixel value calculating means calculates an average value of the two input pixels that face each other across the to-be-interpolated pixel in a predetermined direction.

16. An image interpolation device as claimed in claim 15, wherein, when no direction is recognized by the edge direction checking means as a direction in which an edge is found, a direction in which the interpolated pixel value calculating means calculates the average value of two input pixels that face each other across the to-be-interpolated pixel is determined in accordance with a type of an image processed.

17. An image interpolation device as claimed in claim 10, wherein, when a plurality of directions are detected by the edge detecting means, the interpolated pixel value calculating means calculates an average value of the two input pixels that face each other across the to-be-interpolated pixel in a predetermined direction.

18. An image interpolation device as claimed in claim 10, wherein the edge direction checking means does not recognize a direction as a direction in which an edge is found unless the absolute value of the difference between the two input pixels that face each other across the to-be-interpolated pixel in that direction is less than or equal to a predetermined value.

* * * * *